United States Patent
Hwang et al.

(10) Patent No.: US 11,153,844 B2
(45) Date of Patent: Oct. 19, 2021

(54) METHOD FOR ESTIMATING POSITION OF WIRELESS NETWORK EQUIPMENT

(71) Applicant: I-SHOU UNIVERSITY, Kaohsiung (TW)

(72) Inventors: Lain-Chyr Hwang, Kaohsiung (TW); Chao-Shun Chen, Kaohsiung (TW); Te-Tien Ku, Kaohsiung (TW); Wei-Cheng Shyu, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 33 days.

(21) Appl. No.: 16/831,210

(22) Filed: Mar. 26, 2020

(65) Prior Publication Data

US 2021/0204242 A1 Jul. 1, 2021

(30) Foreign Application Priority Data

Dec. 26, 2019 (TW) ................................. 108147856

(51) Int. Cl.
*H04W 64/00* (2009.01)
*G01S 5/02* (2010.01)

(52) U.S. Cl.
CPC ......... *H04W 64/003* (2013.01); *G01S 5/0278* (2013.01)

(58) Field of Classification Search
CPC ........................... H04W 64/003; G01S 5/0278
See application file for complete search history.

(56) References Cited

U.S. PATENT DOCUMENTS

2011/0257923 A1* 10/2011 Boulton ............... G01S 5/0221 702/117
2017/0332248 A1* 11/2017 Syrjarinne ........... G01C 21/206
2018/0288055 A1 10/2018 Jung et al.

FOREIGN PATENT DOCUMENTS

TW M561232 U 6/2018
TW I661284 B 6/2019

OTHER PUBLICATIONS

NPL: LoRA Transmission Parameter Selection; Authors: Martin Bor, Utz Roedig; Year 2017, pp. 27-34.*

(Continued)

*Primary Examiner* — Marisol Figueroa
(74) *Attorney, Agent, or Firm* — Birch, Stewart, Kolasch & Birch, LLP

(57) ABSTRACT

A method for estimating an position of wireless network equipment, including setting a wireless network transmission parameter, wherein the wireless network transmission parameter includes a transmitting power, a carrier frequency and a spreading factor index, which are used for performing an initial operation setting of wireless network; according to the wireless network transmission parameter, providing a path loss index and a reference distance for simulating an actual wireless network environment; selecting a noise power to simulate a signal state of a transmission path; and according to a field domain, setting a received power threshold to calculate a predetermined transmission distance of wireless network equipment erection. By means of the above method, a better setting position of a better wireless terminal equipment can be calculated more efficiently, and a proper position of a node equipment can be determined by using a signal measurement or packetized transfer reception and loss conditions in the vicinity of an estimated distance from a base station.

10 Claims, 1 Drawing Sheet

(56) References Cited

OTHER PUBLICATIONS

Hwang et al., "A bridge between the smart grid and the Internet of Things: Theoretical and practical roles of LoRa", Electrical Power and Energy Systems, vol. 113, 2019, 971-981.

* cited by examiner

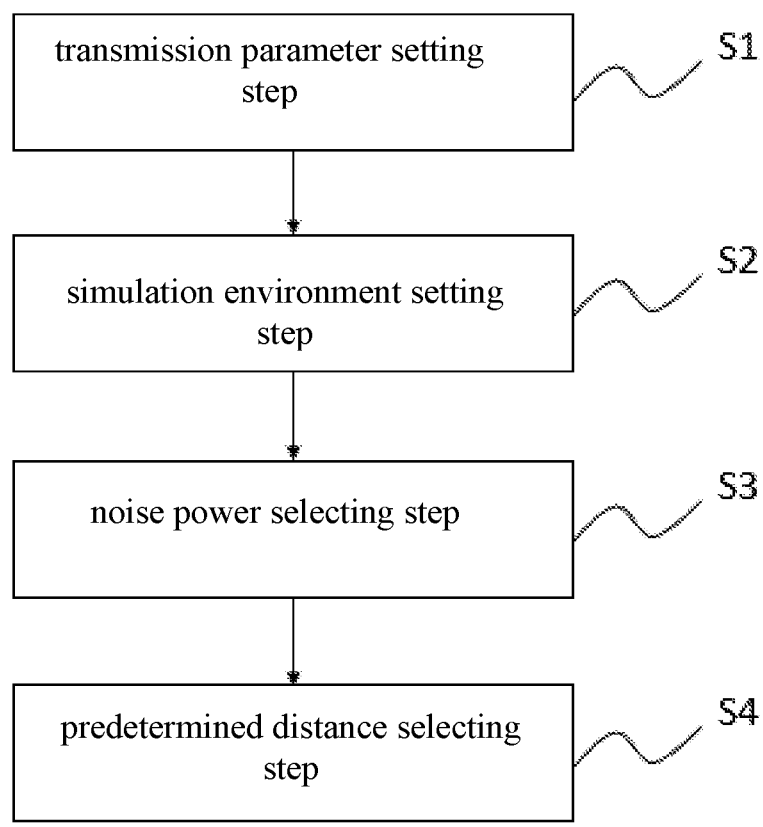

METHOD FOR ESTIMATING POSITION OF WIRELESS NETWORK EQUIPMENT

CROSS-REFERENCE TO RELATED APPLICATIONS

The present disclosure claims priority to Taiwan Patent Application No. 108147856 filed on Dec. 26, 2019, which is incorporated herein by reference for all purposes.

TECHNICAL FIELD

The disclosure relates to a method for estimating a position, in particular to a method for estimating position of wireless network equipment.

BACKGROUND OF THE INVENTION

At present, method for setting wireless terminal equipment for LoRa (Long Range) transmission is through trial and error, which is to find erection points one by one by measuring strength of signals. Especially during construction process of smart grid, in order to build wireless terminal equipment which can be connected to each other between two nodes and have a good communication effect, the trial and error of the prior art will consume a lot of manpower, time and cost, which is very inefficient. Therefor it is necessary to improve.

BRIEF SUMMARY OF THE INVENTION

A purpose of the present disclosure is to provide a method for estimating position of wireless network equipment, and the method for estimating position of wireless network equipment provides a more efficient and accurate method for estimating node distance.

To achieve the above purpose and other, a method for estimating position of wireless network equipment of present disclosure in one embodiment includes setting a wireless network transmission parameter, wherein the wireless network transmission parameter includes a transmitting power, a carrier frequency and a spreading factor index, which are used for performing an initial operation setting of wireless network; according to the wireless network transmission parameter, providing a path loss index and a reference distance for simulating an actual wireless network environment; selecting a noise power to simulate a signal state of a transmission path; and according to a field domain, setting a received power threshold to calculate a predetermined transmission distance of wireless network equipment erection.

Preferably, the transmitting power ranges from 0 dBm (decibel relative to one milliwatt) to 20 dBm (decibel relative to one milliwatt); the carrier frequency ranges from 828 MHz (megahertz) to 928 MHz (megahertz) and the spreading factor index ranges from 6 to 12.

Preferably, the path loss index ranges from 2 to 6.

Preferably, the reference distance ranges from 1 m (meter) to 100 m (meter).

Preferably, the noise power ranges from −80 dBm (decibel relative to one milliwatt) to −20 dBm (decibel relative to one milliwatt).

Preferably, the received power threshold is greater than or equal to a capability of a received power in the upper quartile.

Preferably, the received power threshold is greater than or equal to a value of the average received power.

Preferably, the received power threshold is greater than or equal to a capability of the received power in the upper quartile.

Preferably, a calculation mode of the predetermined transmission distance (d) is as follow:

$$d = 10^{\frac{137.56 - 20 log f + 10(n-2) log d_0 + P_t(dBm) - \Delta(dB) + 2.5 SFE - N_a(dBm)}{10n}}$$

wherein, d is a predetermined transmission distance; $P_t$ is a transmitting power; f is a carrier frequency; SFE is a spreading factor index; n is a path loss index; $d_0$ is a reference distance; $N_a$ is a noise power and $\Delta$ is a translational power. Preferably, when a distance is estimated in a conservative case, the translational power $\Delta$ is +1.43; when a distance is estimated in an optimistic case, the translational power $\Delta$ is −1.61.

BRIEF DESCRIPTION OF THE DRAWINGS

FIG. 1 is a schematic flowchart of method for estimating position of wireless network equipment according to an embodiment of the present disclosure.

DETAILED DESCRIPTION OF THE INVENTION

In the following, the technical solutions in the embodiments of the present disclosure will be clearly and completely described with reference to the FIGURES of the embodiments of the present disclosure and not all the embodiments. All other embodiments obtained by those skilled in the are based on the embodiments of the present disclosure without creative work are within the scope of the present disclosure.

The following embodiments can be used to develop a method for estimating node distance of LoRa in conjunction with Shadowing effect and Multipath fading theory.

Referring to FIG. 1, a method for estimating position of wireless network equipment of present disclosure includes a transmission parameter setting step S1, and the transmission parameter setting step S1 includes a wireless network transmission parameter, wherein the wireless network transmission parameter includes a transmitting power $P_t$, a carrier frequency f and a spreading factor index SFE, which are used for performing an initial operation setting of wireless network. Due to the fact that the wireless network transmission parameter can affect a transmission distance, network erection can be further affected, and according to transmission loss characteristic, the larger is the transmitting power $P_t$ and the lower is the carrier frequency f, the longer is the transmission distance; and according to the spread communication characteristic, the larger is the spreading factor, the longer is the transmission distance.

Preferably, the transmitting power $P_t$ ranges from 0 dBm (decibel relative to one milliwatt) to 20 dBm (decibel relative to one milliwatt); the carrier frequency f ranges from 828 MHz (megahertz) to 928 MHz (megahertz) and the spreading factor index SFE ranges from 6 to 12.

The present method also includes a simulation environment setting step S2, and according to the wireless network transmission parameter, the simulation environment setting step S2 provides a path loss index n and a reference distance $d_0$ for simulating an actual wireless network environment. Preferably, the path loss index n ranges from 2 to 6; the most basic Friis transmission loss (Friis transmission equation)

need to be modified due to the fact that an actual wireless network environment is not a vacuum state, and a transmission path in the original Friis transmission equation is considered under a vacuum condition, at which time a received power is inversely proportional to the square of the distance. However, under a non-vacuum condition, the received power is more attenuated, thereby introducing the path loss index n here to emphasize the shadowing effect. However, moreover, as obstacles on the transmission path increase, the path loss index n can be selected to be an appropriate value depending on the environment, and when the smaller is the path loss index n, the smaller is the transmission distance, such as the path loss index n is 2 when free of obstacles under the vacuum condition, and the path loss index n ranges from 2.7 to 3.5 in the environment with the buildings; the reference distance $d_0$ is a theoretical reference value used for calculating the received power in the non-vacuum state; preferably, the reference distance $d_0$ ranges from 1 m to 100 m, therefor, in the present disclosure, the reference distance $d_0$ can be set to be 1 m to 10 m in an indoor environment and 10 m to 100 m in an outdoor environment.

The present method also includes a noise power selecting step S3 for selecting a noise power $N_a$ to simulate a signal state of the transmission path; due to the fact that the noise power on the wireless signal transmission path can affect correctness of data reception, and indirectly influence the distance that the signal can be transmitted, the higher is the noise power, and the shorter is the transmission distance. Preferably, the noise power $N_a$ ranges from −80 dBm (decibel relative to one milliwatt) to −20 dBm (decibel relative to one milliwatt); in the present disclosure, in order to facilitate calculation by user, the noise power selecting step S3 provides three default selection of noise power values for the user: the low noise power is −80 dBm, the moderate noise power is −70 dBm, and the high noise power is −60 dBm; the user certainly can also enter an appropriate value of the noise power $N_a$ depending on the current condition, and setting of the noise power $N_a$ can be altered according to the environment.

The present method also includes a predetermined distance selecting step S4. The predetermined distance selecting step S4 takes Rayleigh fading that is commonly used with Multipath fading into account, that is, the received power is not a determined value. Since energy received by a receiving end forms a random distribution due to Multipath effects, the most commonly used Rayleigh distribution is herein used to calculate the position distance of the wireless network equipment. The predetermined distance selecting step S4 is setting a received power threshold p according to a field domain to calculate a predetermined transmission distance d of wireless network equipment erection, wherein the predetermined transmission distance d is a distance between two node equipment of the wireless communication network, and the received power threshold ρ is used for determining proper position of the node equipment through measured signal strength and packetized transfer reception and loss conditions at the predetermined transmission distance d. Preferably, the received power threshold ρ can be set to three types: conservative, average, and optimistic respectively depending on the acceptable strength of the received power of the node equipment. A calculation mode of the predetermined transmission distance d is as follow:

$$d = 10^{\frac{137.56 - 20\log f + 10(n-2)\log d_0 + P_t(dBm) - \Delta(dB) + 2.5SFE - N_a(dBm)}{10n}}$$

wherein Δ is a translational power, and the translational power Δ is a difference between the required received power and the average received power, and when the required received power is higher than the average received power, the translational power is positive (+), otherwise negative (−); besides, in the present disclosure, when a distance is estimated in a conservative case, the translational power Δ is +1.43, and when a distance is estimated in an optimistic case, the translational power Δ is −1.61. Wherein, in terms of the setting position distance of the node equipment calculated by the three types of the received power threshold ρ, the predetermined transmission distance d calculated by the conservative type is relatively minimum, and the predetermined transmission distance d calculated by the optimistic type is relatively maximum.

Preferably, the received power threshold ρ is greater than or equal to a capability of the received power in the upper quartile, and the received power threshold ρ of the conservative type represents that the received power is at least first 25% of all the received power, which is considered to be a successful transmission; the predetermined transmission distance d calculated at this point is relatively small, but the strength and stability of the received power are relatively good.

Preferably, the received power threshold ρ is greater than or equal to a value of the average received power, and the received power threshold ρ of the average type represents that the received power is the average of all the received power; the predetermined transmission distance d calculated at this point is relatively modest, and the strength and stability of the received power are relatively modest.

Preferably, the received power threshold ρ is greater than or equal to a capability of the received power in the middle quartile, and the received power threshold ρ of the optimistic type represents that the received power can be a successful transmission as long as reaching to first 50% of all the received power; the predetermined transmission distance d calculated at this point is relatively large, but the strength and stability of the received power are relatively poorly.

By means of the above manner, the user can perform calculation of the reference distance of setting the node equipment according to the applied field domain, thereby reducing labor cost and improving time efficiency. In one embodiment, the transmitting power $P_t$=20 dBm; the carrier frequency f=840 MHz; the reference distance $d_0$=10 m; the spreading factor index SFE=10; the path loss index n=2.5; the noise power $N_a$=−70 dBm; therefor, three sets of the estimated predetermined transmission distance d can be obtained: 1276 m of the conservative type (for strict applications), 1455 m of the average type (for general applications) and 1688 m of the optimistic type (for less strict applications). The user can select one as a reference basis according to required degree of network condition to be set, so as to erect a wireless communication equipment in the vicinity of the estimated distance from another node equipment (also known as a wireless node, or commonly referred to as a base station).

It will be apparent to those skilled in the art that the present disclosure is not limited to the details of the above-described exemplary embodiments and the present disclosure can be realized in other specific forms without departing from the sprit or essential characteristics thereof. Thus, the embodiments should be considered as exemplary and non-limiting, regardless of the point of view. The scope of the present disclosure is defined by the appended claims rather than the above description. It is intended that all changes that fall within the meaning and range of equivalents of the claims be included in the present disclosure. Any reference signs in the claims should not be construed as limiting the claims.

In addition, it should be understood that although this specification is described in terms of embodiments, not every embodiment includes only on independent technical solution. This manner in which the specification is described in for the sake of clarity only, those skilled in the art should refer to the specification as a whole, and the technical solutions in the embodiments may also be suitably combined to form other embodiments that may be understood by those skilled in the art.

The invention claimed is:

1. A method for estimating a position of wireless network equipment, comprising:
setting a wireless network transmission parameter, wherein the wireless network transmission parameter comprises a transmitting power, a carrier frequency and a spreading factor index, which are used for performing an initial operation setting of wireless network;
according to the wireless network transmission parameter, providing a path loss index and a reference distance, for simulating an actual wireless network environment;
selecting a noise power, to simulate a signal state of a transmission path; and
according to a field domain, setting a received power threshold to calculate a predetermined transmission distance of wireless network equipment erection.

2. The method for estimating the position of wireless network equipment according to claim 1, wherein the transmitting power ranges from 0 dBm (decibel relative to one milliwatt) to 20 dBm (decibel relative to one milliwatt), the carrier frequency ranges from 828 MHz (megahertz) to 928 MHz (megahertz), and the spreading factor index ranges from 6 to 12.

3. The method for estimating the position of wireless network equipment according to claim 1, wherein the path loss index ranges from 2 to 6.

4. The method for estimating position of wireless network equipment according to claim 1, wherein the reference distance ranges from 1 m (meter) to 100 m (meter).

5. The method for estimating the position of wireless network equipment according to claim 1, wherein the noise power ranges from −80 dBm (decibel relative to one milliwatt) to −20 dBm (decibel relative to one milliwatt).

6. The method for estimating the position of wireless network equipment according to claim 1, wherein the received power threshold is greater than or equal to a capability of a received power in the upper quartile.

7. The method for estimating the position of wireless network equipment according to claim 1, wherein the received power threshold is greater than or equal to a value of the average received power.

8. The method for estimating the position of wireless network equipment according to claim 1, wherein the received power threshold is greater than or equal to a capability of the received power in the middle quartile.

9. The method for estimating the position of wireless network equipment according to claim 1, wherein a calculation mode of the predetermined transmission distance (d) is as follow:

$$d = 10^{\frac{137.56 - 20\log f + 10(n-2)\log d_0 + P_t(dBm) - \Delta(dB) + 2.5 SFE - N_a(dBm)}{10n}}$$

wherein, d is a predetermined transmission distance, $P_t$ is a transmitting power, f is a carrier frequency, SFE is a spreading factor index, n is a path loss index, $d_0$ is a reference distance, $N_a$ is a noise power, and $\Delta$ is a translational power.

10. The method for estimating the position of wireless network equipment according to claim 9, wherein when a distance is estimated in a conservative case the translational power $\Delta$ is +1.43, when a distance is estimated in an optimistic case the translational power $\Delta$ is −1.61.

* * * * *